(12) United States Patent
Fujii et al.

(10) Patent No.: US 9,282,468 B2
(45) Date of Patent: Mar. 8, 2016

(54) COMMUNICATION DEVICE, COMMUNICATION METHOD AND COMMUNICATION SYSTEM

(75) Inventors: Takeo Fujii, Kawasaki (JP); Kensuke Fujii, Hitachi (JP)

(73) Assignee: THE UNIVERSITY OF ELECTRO-COMMUNICATIONS, Tokyo (JP)

( * ) Notice: Subject to any disclaimer, the term of this patent is extended or adjusted under 35 U.S.C. 154(b) by 95 days.

(21) Appl. No.: 13/880,570

(22) PCT Filed: Oct. 18, 2011

(86) PCT No.: PCT/JP2011/073967
§ 371 (c)(1),
(2), (4) Date: Apr. 19, 2013

(87) PCT Pub. No.: WO2012/053523
PCT Pub. Date: Apr. 26, 2012

(65) Prior Publication Data
US 2013/0208654 A1    Aug. 15, 2013

(30) Foreign Application Priority Data
Oct. 20, 2010 (JP) ................................ 2010-235697

(51) Int. Cl.
*H04W 16/26* (2009.01)
*H04B 7/02* (2006.01)
(Continued)

(52) U.S. Cl.
CPC ............... *H04W 16/26* (2013.01); *H04B 7/026* (2013.01); *H04B 7/0617* (2013.01); *H04B 7/0865* (2013.01); *H04B 7/15528* (2013.01); *H04B 7/0452* (2013.01)

(58) Field of Classification Search
CPC ............. H04W 72/00; H04W 72/1226; H04L 5/0001; H04B 7/26; H04B 7/0865
USPC ...................... 455/370, 30; 370/492, 315, 328
See application file for complete search history.

(56) References Cited

U.S. PATENT DOCUMENTS 7,826,337 B2 * 11/2010 Shi et al. ........................ 370/201
7,957,334 B2    6/2011 Fujii et al.
(Continued)

FOREIGN PATENT DOCUMENTS

| JP | A-2009-105842 | 5/2009 |
| JP | A-2010-532932 | 10/2010 |
| WO | WO 2009/057400 A2 | 5/2009 |

OTHER PUBLICATIONS

Nabar et al., "Fading Relay Channels: Performance Limts and Space-Time Signal Design," *IEEE Journal on Selected Areas in Communications*, Aug. 2004, vol. 22, No. 6, pp. 1099-1109.

(Continued)

*Primary Examiner* — Shaq Taha
*Assistant Examiner* — Sasha Cintron Pacheco
(74) *Attorney, Agent, or Firm* — Oliff PLC

(57) ABSTRACT

A communication device, a communication method and a communication system that enable an increase in channel capacity at cell edges of a plurality of cells. Data transmission is implemented by transmission stations, which are base stations of adjacent cells, by MIMO transmission. A relay station receives radio waves that are transmitted by both the transmission station and the transmission station, and acquires data transmitted by the transmission station and data transmitted by the transmission station. The relay station transmits data to reception stations in adjacent cells according to multi-user MIMO transmission. The data transmitted by the transmission station is received by the reception station via the relay station, and the data transmitted by the transmission station is received by the reception station via the relay station. The present invention can be used in cellular systems.

6 Claims, 11 Drawing Sheets

(51) Int. Cl.
   *H04B 7/155* (2006.01)
   *H04B 7/06* (2006.01)
   *H04B 7/08* (2006.01)
   *H04B 7/04* (2006.01)

(56) References Cited

U.S. PATENT DOCUMENTS

| | | | |
|---|---|---|---|
| 8,488,480 B2 * | 7/2013 | Han et al. | 370/252 |
| 8,649,731 B2 * | 2/2014 | Onodera et al. | 455/7 |
| 2009/0117911 A1 | 5/2009 | Molisch et al. | |
| 2010/0232436 A1 | 9/2010 | Fujii et al. | |
| 2010/0279725 A1 | 11/2010 | Muraoka et al. | |
| 2011/0199965 A1 | 8/2011 | Ariyoshi et al. | |
| 2011/0228683 A1 | 9/2011 | Ariyoshi et al. | |

OTHER PUBLICATIONS

Huayu et al., "The Relay Shared by Three Neighboring Cells with Distributed Antennas," *IEEE International Conference on Communications and Mobile Computing*, 2010, pp. 383-386.

Fujii et al., "A Study of Adaptive Relaying on Multi-Cell Cooperative Environment," *IEICE Communications Society Conference*, Sep. 2009, pp. 475 (with translation).

El-Keyi et al., "Cooperative Mimo-Beamforming for Multiuser Relay Networks," *Speech and Signal Processing, ICASSP*, Apr. 2008, pp. 2749-2752.

Palomar et al., "Joint Tx-Rx Beamforming Design for Multicarrier MIMO Channels: A Unified Framework for Convex Optimization," *IEEE Transactions on Signal Processing*, Sep. 2003, vol. 51, No. 9, pp. 2381-2401.

International Search Report issued in International Patent Application No. PCT/JP2011/073967 mailed Nov. 15, 2011 (with translation).

Written Opinion of the International Searching Authority issued in International Patent Application No. PCT/JP2011/073967 mailed Nov. 15, 2011 (with translation).

International Preliminary Report on Patentability issued in International Patent Application No. PCT/JP2011/073967 mailed Dec. 3, 2012 (with translation).

Oct. 28, 2014 Office Action issued in Japanese Application No. 210-235697.

* cited by examiner

FIG. 7

| FREQUENCY BAND | 2.0 [GHz] |
|---|---|
| FREQUENCY BAND WIDTH | 5 [MHz] |
| CELL RADIUS | 1000 [m] |
| BASE STATION-RELAY STATION RADIUS (WHEN DISPOSED IN CELL) | 500 [m] |
| DISTANCE ATTENUATION (r [km]) | $128.1 + 37.6 \log 10(r)$ [dB] |
| SHADOWING STANDARD DEVIATION | 8 [dB] |
| INDOOR TRANSMISSION ATTENUATION | 20 [dB] |
| NO. OF BASE STATION ANTENNAS | 2 |
| NO. OF RELAY STATION ANTENNAS (WHEN DISPOSED IN CELL) | 2 |
| NO. OF RELAY STATION ANTENNAS (WHEN DISPOSED AT CELL EDGE) | 4 |
| NO. OF TERMINAL ANTENNAS | 2 |
| TRANSMISSION POWER OF THE BASE STATION | 43 [dBm] |
| TRANSMISSION POWER OF RELAY STATION (WHEN DISPOSED IN CELL) | 37 [dBm] |
| TRANSMISSION POWER OF RELAY STATION (WHEN DISPOSED AT CELL EDGE) | 40 [dBm] |
| NOISE POWER DENSITY | −169 [dBm/Hz] |

COMMUNICATION DEVICE, COMMUNICATION METHOD AND COMMUNICATION SYSTEM

TECHNICAL FIELD

The present invention relates to a communication device, a communication method and a communication system, and more particularly to a communication device, a communication method and a communication system in which channel capacity can be increased at cell edges of a plurality of cells.

BACKGROUND ART

Next-generation mobile phone standards such as IMT-Advanced demand higher communication speeds and greater communication capacities at levels exceeding 100 Mbps. Schemes that have been studied with the aim of realizing such communication speeds include MIMO (Multiple Input Multiple Output) transmission, in which space-division multiplexing is performed using a communication station that has a plurality of antennas.

In MIMO transmission, distinct data is transmitted simultaneously by a plurality of antennas, on the transmission side, and received data is combined on the reception side; as a result, it becomes possible to increase the capacity of transmission lines, and to realize higher communication speeds. Also, radio waves from the transmission side reach the reception side over a plurality of routes, and hence it becomes possible to suppress deterioration of communication quality even if numerous obstacles are in the way.

In cellular systems, in particular, various methods under study aim at increasing communication speed and capacity on or in the vicinity of cell boundaries where reception signal power is low. Relay transmission by way of a relay station is one such method (Non-Patent Document 1). In relay transmission, power of a signal transmitted by a transmission station is amplified, and the amplified-power signal is retransmitted and received by a reception station, so that the power of the reception signal in the reception station and the channel capacity are both increased as a result. Methods of relay transmission include, for instance, Amplify-and-Forward (AF), where the relay station just amplifies the power of received signals, and Decode-and-Forward (DF), where the received signal is demodulated and decoded, and is thereafter re-decoded and re-modulated.

Performing relay transmission is advantageous in that this ordinarily enables communication also outside areas where communication with a transmission station is possible, and in that channel capacity can be increased by virtue of the diversity effect that is achieved, in the reception station side, through the use of signals transmitted by the transmission station to the reception station and of signals transmitted by the relay station to the reception station.

In a multi-cell environment, however, signals amplified by a relay station that is disposed in a given cell may interfere with a reception station in another cell, the SINR (Signal to Interference and Noise Ratio) may drop on account of the increased interference signal power, and channel capacity may drop. These occurrences, which are particularly noticeable in cases where a downlink reception station or an uplink transmission station are present on or in the vicinity of a cell boundary, may constitute a hindrance to expanding a communication area.

Accordingly, various technologies have been proposed that are aimed, in particular, at improving communication quality in cases of interference from other cells on or in the vicinity of cell boundaries. For instance, Patent Document 1 discloses a technology that involves detecting interference from neighboring cells at a relay station disposed in a given cell, notifying information on the detected interference to a terminal that is present on or in the vicinity of the boundary of the same cell, and removing an interference component in that terminal.

Patent Document 1: Japanese Patent Application Publication No. 2009-105842

Non-Patent Document 1: R. U. Nabar, H. Blocskei, and F. W. Kneubuhler, "Fading relay channels: performance limits and space-time signal design", IEEE Journal on Selected Areas in Communications, vol. 22, No. 6, pp. 1099-1109, 2004

DISCLOSURE OF THE INVENTION

In the technology disclosed in Patent Document 1, the power of the signals from the transmission station is not amplified in the relay station. The relay station merely detects interference from neighboring cells, and notifies information on the detected interference to a terminal.

The above technology does not contemplate multi-user MIMO transmission across cells, wherein a relay station receives signals from a plurality of distinct cells, and transmits data to a plurality of terminals that are present in the respective cells.

In the light of the above, it is an object of the present invention to increase channel capacity at cell edges of a plurality of cells.

A communication device in one aspect of the present invention comprises a first estimation unit that estimates a state of respective communication channels between the communication device and a plurality of transmitting devices that are present in respective distinct cells and that transmit data in accordance with MIMO transmission; a reception unit that receives data, respectively transmitted by the plurality of transmitting devices, in accordance with a transmission timing in which synchronization between the transmitting devices is established, by using a reception weight determined on the basis of the state of the communication channels as estimated by the first estimation unit; and a transmission unit that transmits, in accordance with multi-user MIMO transmission, data received by the reception unit, to a plurality of receiving devices present in the respective cells in which data is transmitted by the plurality of transmitting devices.

The cells can be adjacent cells, and the communication device can be present on or in the vicinity of the boundary between the adjacent cells.

There can be provided a second estimation unit that estimates the state of respective communication channels between the communication device and the plurality of receiving devices. In this case, the transmission unit can be caused to transmit data received by the reception unit in use of a transmission weight determined on the basis of the state of the communication channels as estimated by the second estimation unit.

A communication method by a communication device, in one aspect of the present invention involves estimating a state of respective communication channels between the communication device and a plurality of transmitting devices that are present in respective distinct cells and that transmit data in accordance with MIMO transmission; receiving data respectively transmitted by the plurality of transmitting devices without sharing transmission data or channel state information among the respective transmitting devices, in accordance with a transmission timing in which synchronization between the transmitting devices is established, via an antenna that receives radio waves transmitted by the plurality of transmitting devices; separating, by a reception unit which is common to the plurality of transmitting devices, the received data into data pieces respectively transmitted from the plurality of transmitting devices by using a reception weight determined on the basis of the state of the estimated communication channels; and transmitting the separated respective data, in accordance with multi-user MIMO transmission, to a plurality of receiving devices present in the respective cells in which data is transmitted by the plurality of transmitting devices.

A communication system in another aspect of the present invention is a communication system comprising a plurality of transmitting devices, a communication device and a plurality of receiving devices, wherein the plurality of transmitting devices are present in respective distinct cells, with each of the transmitting devices comprising: a synchronization unit that establishes synchronization of a transmission timing of data with other transmitting devices; and a transmission unit that transmits data without sharing transmission data or channel state information among the respective transmitting devices, by MIMO transmission, according to a transmission timing in which synchronization is established by the synchronization unit, and the communication device comprises: a first estimation unit that estimates the state of respective communication channels between the communication device and the plurality of transmitting devices, a reception unit that is common to the plurality of transmitting devices, and that receives data respectively transmitted by the plurality of transmitting devices, via an antenna that receives radio waves transmitted by the plurality of transmitting devices, and that separates the received data into data pieces respectively transmitted from the plurality of transmitting devices by using a reception weight determined on the basis of the state of communication channels as estimated by the first estimation unit; and a transmission unit that transmits, in accordance with multi-user MIMO transmission, the separated respective data to the plurality of receiving devices, and wherein the plurality of receiving devices are respectively present in the cells in which the plurality of transmitting devices manage transmission of data, with each of the receiving devices comprising: a second estimation unit that estimates the state of a communication channel between the receiving device and the communication device; and a reception unit that receives data transmitted by the communication device in use of a reception weight determined on the basis of the state of the communication channel as estimated by the second estimation unit.

In one aspect of the present invention, there is estimated a state of respective communication channels with a plurality of transmitting devices that are present in respective distinct cells and that transmit data in accordance with MIMO transmission; data respectively transmitted by the plurality of transmitting devices is received in accordance with a transmission timing in which synchronization between the transmitting devices is established, using a reception weight determined on the basis of the estimated state of the communication channels; and the received data is transmitted, in accordance with multi-user MIMO transmission, to a plurality of receiving devices present in the respective cells in which data is transmitted by the plurality of transmitting devices.

In another aspect of the present invention, synchronization of transmission timing of data is established between each of the plurality of transmitting devices and another transmitting device; and data is transmitted, by MIMO transmission, in accordance with the transmission timing in which synchronization has been established. In the communication device, there is estimated the state of respective communication channels between the communication device and the plurality of transmitting devices; there is received data transmitted by the plurality of transmitting devices, using a reception weight determined on the basis of the estimated state of the communication channels; and the received data is transmitted, in accordance with multi-user MIMO transmission, to a plurality of receiving devices. In each of the plurality of receiving devices, there is estimated the state of a communication channel between the receiving device and the communication device, and there is received data transmitted by the communication device, using a reception weight determined on the basis of the estimated state of the communication channel.

The present invention allows increasing channel capacity at cell edges of a plurality of cells, and allows reducing the bit error rate.

BRIEF DESCRIPTION OF THE DRAWINGS

FIG. 7 is a diagram illustrating parameters used in simulation;

BEST MODE FOR CARRYING OUT THE INVENTION

<Configuration Example of a Communication System>

Figure 1:
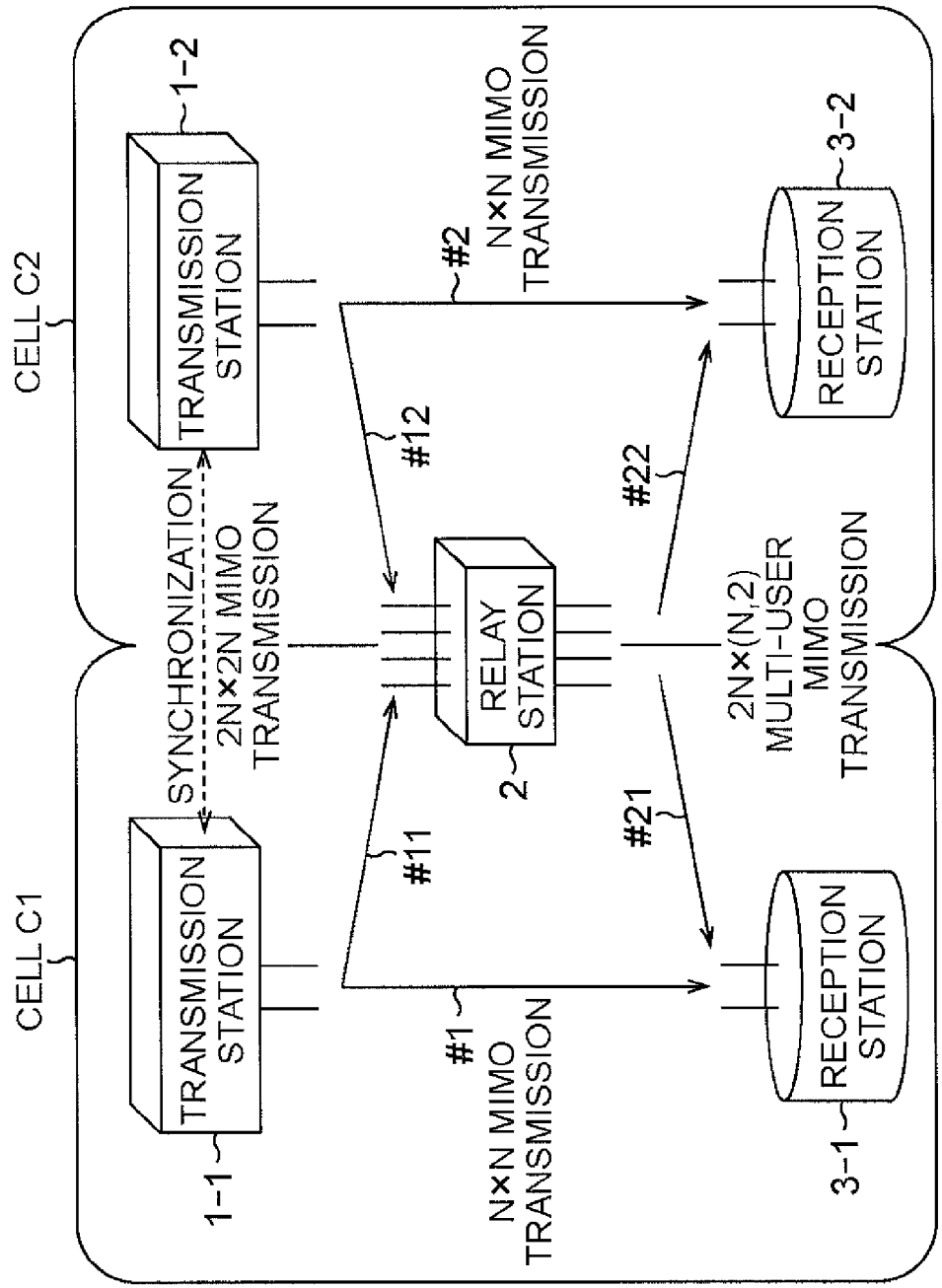
FIG. 1 is a diagram illustrating a configuration example of a communication system according to an embodiment of the present invention.

FIG. 1 is a diagram illustrating a configuration example of a communication system according to an embodiment of the present invention.

The communication system of FIG. 1 is a cellular communication system, and comprises transmission stations 1-1, 1-2, a relay station 2, and reception stations 3-1, 3-2. The transmission station 1-1 and the reception station 3-1 are present in a cell C1, and the transmission station 1-2 and the reception station 3-2 are present in a cell C2. The cell C1 and the cell C2 are adjacent cells, and the relay station 2 is present on or in the vicinity of the boundary between the cell C1 and the cell C2.

The transmission stations 1-1, 1-2 are base stations that transmit data to terminals within the cell in which the transmission stations 1-1, 1-2 are present, using radio waves of a predetermined frequency band, for instance a 2 GHz band or the like. The transmission station 1-1 transmits data to a terminal within the cell C1, and the transmission station 1-2 transmits data to a terminal within the cell C2. As denoted by the dotted arrow, data transmission by the transmission stations 1-1, 1-2 is performed by keeping synchronization (symbol synchronization).

Data transmission by the transmission stations 1-1, 1-2 is performed according to MIMO transmission. In T×R MIMO transmission, where T denotes the number of transmission side antennas (transmission antennas) and R denotes the number of reception side antennas (reception antennas), N×N MIMO transmission is performed, as denoted by arrow #1, between the transmission station 1-1 having N transmission antennas, and the reception station 3-1 having N reception antennas and that is present in the cell C1. Similarly, N×N MIMO transmission, as denoted by arrow #2, is performed between the transmission station 1-2 having N transmission antennas and the reception station 3-2 having N reception antennas and that is present in the cell C2. In FIG. 1, thus, N=2.

The relay station 2 is a communication device having 2n reception antennas. The relay station 2 receives radio waves that are transmitted by the transmission station 1-1 and the transmission station 1-2, using the 2n reception antennas, also during MIMO transmission between the transmission stations and reception stations that takes place in the cell C1 and the cell C2, and acquires data transmitted by the transmission station 1-1 and data transmitted by the transmission station 1-2. Herein, 2n ×2n MIMO transmission as denoted by arrows #11, #12 is carried out between the transmission stations and relay station, considering the transmission station 1-1 and the transmission station 1-2, which transmit data by keeping synchronization, to be one station.

The relay station 2 has 2n transmission antennas. The relay station 2 transmits to the reception station 3-1, according to multi-user MIMO transmission, data transmitted by the transmission station 1-1, and transmits to the reception station 3-2 data transmitted by the transmission station 1-2. Thus, 2n ×(N, 2) multi-user MIMO transmission is carried out between the relay station-reception stations, as denoted by arrows #21, #22. Herein, (N, 2) indicates that there are two reception stations having each N reception antennas. The power of signals that denote data transmitted by the transmission stations 1-1, 1-2 is amplified, as appropriate, in the relay station 2. According to multi-user MIMO transmission, weighting of the transmission antennas by the relay station 2 is such that data from the transmission station 1-1 is received only at the reception station 3-1, and is not received at the reception station 3-2. By contrast, weighting of the transmission antennas by the relay station 2 is such that data from the transmission station 1-2 is received only at the reception station 3-2, and is not received at the reception station 3-1. As a result, the transmission signals from the relay station can be transmitted in such a manner that data for the respective reception stations are not influenced by each other.

The reception stations 3-1, 3-2, which are terminals such as mobile phones, personal computers or the like, receive data transmitted by the relay station 2 according to multi-user MIMO transmission. The data transmitted by the transmission station 1-1 is received by the reception station 3-1 via the relay station 2, and the data transmitted by the transmission station 1-2 is received by the reception station 3-2 via the relay station 2.

Thus, in the communication system of FIG. 1, data from transmission stations in a plurality of adjacent cells in a multi-cell environment is transmitted to a relay station according to MIMO transmission, and is transmitted by the relay station to respective reception stations present in adjacent cells, according to multi-user MIMO transmission.

As a result, interference from adjacent cells can be reduced, in both cells, in that interference from the cell C2 can be reduced in the reception station 3-1, and interference from the cell C1 can be reduced in the reception station 3-2. Signals from the transmission stations are amplified in the relay station and are retransmitted. The power of the reception signals in the reception stations can be increased as a result. In particular, channel capacity can be increased at the cell edge, where susceptibility to interference from adjacent cells is greater and the reception power of signals from the transmission station tends to be weaker.

In a case where, for instance, signals from the transmission stations are simply amplified in the relay station and are retransmitted, the interference component from the adjacent cells, as received by the relay station, is amplified as well. In MIMO transmission, however, signal power is amplified after separation of the data transmitted by the transmission stations, and the data is transmitted to the reception stations according to multi-user MIMO transmission; as a result, it becomes possible to remove the interference component from the adjacent cells in the relay station, and to increase the channel capacity at the cell edge, as described above.

<Configuration Examples of the Various Devices>

Figure 2:
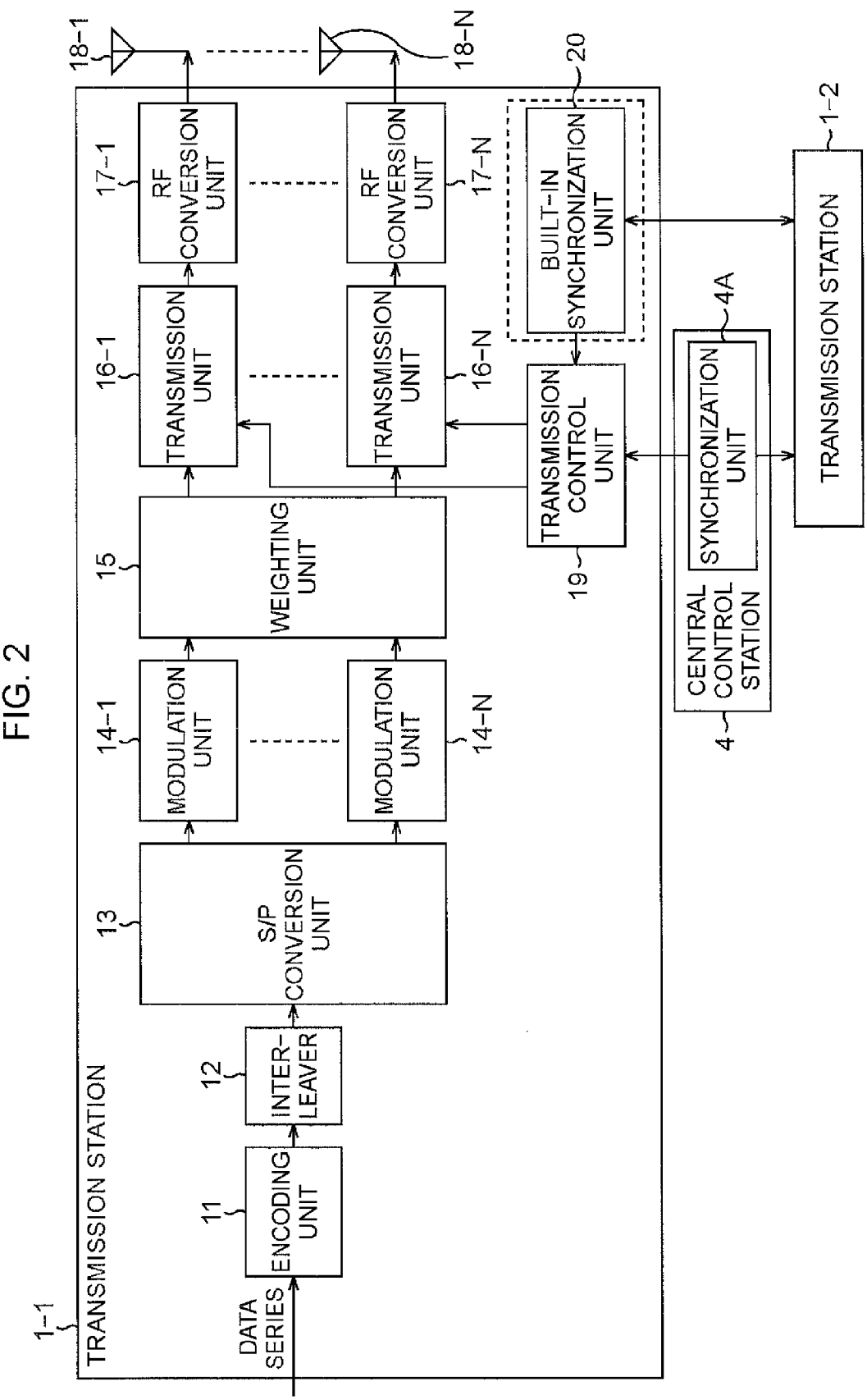
FIG. 2 is a block diagram illustrating a configuration example of a transmission station.

FIG. 2 is a block diagram illustrating a configuration example of the transmission station 1-1. A central control station 4 not shown in FIG. 1 is connected, as appropriate, to the transmission station 1-1 and the transmission station 1-2, by way of a network such as the Internet. A data series to be transmitted is inputted to an encoding unit 11.

The encoding unit 11 encodes the inputted data series according to a predetermined encoding scheme, and outputs the data obtained through encoding to an interleaver 12.

The interleaver 12 interleaves the data supplied by the encoding unit 11, and outputs the interleaved data to an S/P (Serial/Parallel) conversion unit 13.

The S/P conversion unit 13 converts the serial data supplied by the interleaver 12 to parallel data, and outputs data of each branch to modulation units 14-1 to 14-N.

The modulation units 14-1 to 14-N modulate the data supplied by the S/P conversion unit 13 in accordance with a predetermined modulation scheme such as BPSK (Binary Phase Shift Keying), QPSK (Quadrature Phase Shift Keying), 16QAM (Quadrature Amplitude Modulation) or the like, and outputs the modulated data to a weighting unit 15.

The weighting unit 15 performs weighting by multiplying the data of each branch, as supplied by the modulation units 14-1 to 14-N, by a predetermined transmission weight, and outputs the weighted data of each branch to transmission units 16-1 to 16-N. The weighting unit 15 performs weighting using a transmission weight for transmission according to E-SDM (Eigenbeam-Space Division Multiplexing). Herein, MIMO spatial multiplexing schemes include mainly Space Division Multiplexing (SDM), in which data is transmitted to each transmission antenna, and Eigenbeam Space Division Multiplexing (E-SDM), in which data is transmitted for each transmission beam.

The transmission units 16-1 to 16-N perform a process such as D/A conversion or the like on data supplied by the weighting unit 15, and output the obtained signal of each branch to RF (Radio Frequency) conversion units 17-1 to 17-N in accordance with control by the transmission control unit 19. For instance, the output timing of the signals for the RF conversion units 17-1 to 17-N is controlled by the transmission control unit 19.

The RF conversion units 17-1 to 17-N convert the signal of each branch to an RF signal that is transmitted by the transmission antennas 18-1 to 18-N.

The transmission control unit 19 communicates with a synchronization unit 4A of the central control station 4, and receives a synchronization signal transmitted by the synchronization unit 4A. The transmission control unit 19 controls the output timing of data by the transmission units 16-1 to 16-N on the basis of the synchronization signal, in such a manner that synchronization of the data transmitted by the transmission station 1-1 and the data transmitted by the transmission station 1-2 is established. From the viewpoint for instance of the time domain, as a result, the start timings of the data (symbols) transmitted by the transmission station 1-1 and of the data transmitted by the transmission station 1-2 match each other, and the data can be demodulated in the relay station 2.

Through direct communication with a built-in synchronization unit of the relay station 2, the built-in synchronization unit 20 sends and receives a synchronization signal, and establishes synchronization of data with the transmission station 1-2. For instance, the built-in synchronization unit 20 receives a signal from a GPS (Global Positioning System), and establishes synchronization of data with the transmission station 1-2 on the basis of the time information comprised in the received signal. The built-in synchronization unit 20 need not be provided in a case where data synchronization is established on the basis of the synchronization signal transmitted by the central control station 4.

The transmission station 1-2 as well has a configuration similar to the configuration of the transmission station 1-1 illustrated in FIG. 2. An explanation on the configuration of the transmission station 1-2 will thus be omitted.

Figure 3:
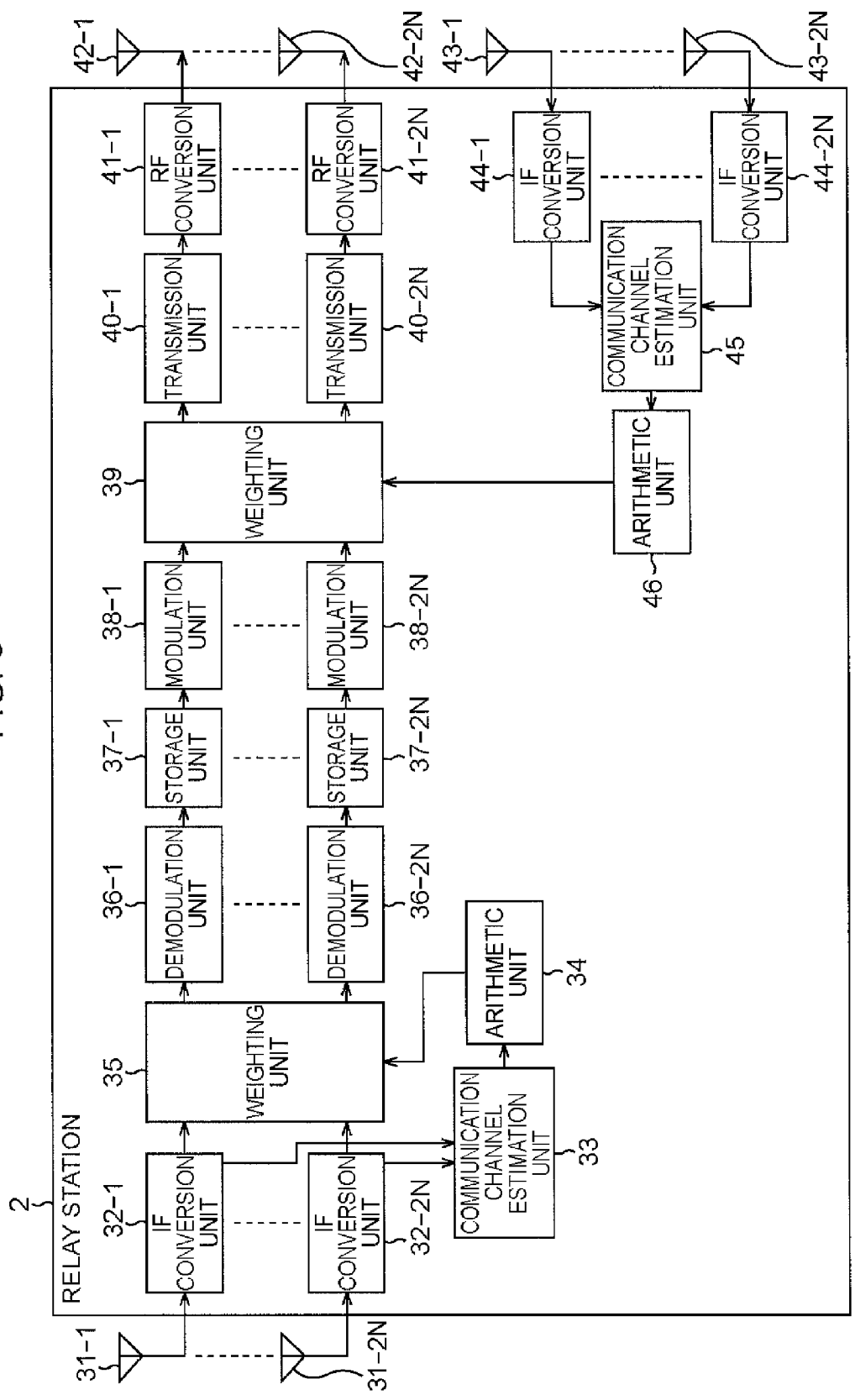
FIG. 3 is a block diagram illustrating a configuration example of a relay station.

FIG. 3 is a block diagram illustrating a configuration example of the relay station 2.

The IF (Intermediate Frequency) conversion units 32-1 to 32-2n convert into IF signals the RF signals supplied by the reception antennas 31-1 to 31-2n, in response to reception of radio waves from the transmission stations 1-1, 1-2. The IF signals obtained as a result of the conversion process are subjected, as appropriate, to A/D conversion, and the obtained data is outputted to a weighting unit 35. The data obtained from the IF conversion units 32-1 to 32-2n is supplied also to a communication channel estimation unit 33.

The communication channel estimation unit 33 detects a pilot signal on the basis of the data supplied by the IF conversion units 32-1 to 32-2n, and estimates respective channel states between the transmission station 1-1 and the relay station 2 and between the transmission station 1-2 and the relay station 2. The communication channel estimation unit 33 outputs, to an arithmetic unit 34, information denoting the channel state between the transmission station 1-1 and the relay station 2, and the channel state between the transmission station 1-2 and the relay station 2.

On the basis of the channel states estimated by the communication channel estimation unit 33, the arithmetic unit 34 computes a reception weight for separating the data transmitted by the transmission station 1-1 and the data transmitted by the transmission station 1-2. For instance, there is worked out a reception weight for separating data in accordance with a signal separation method such as ZF (Zero Forcing), MMSE (Minimum mean Square Error) or the like. The arithmetic unit 34 outputs the reception weight worked out by computation to the weighting unit 35.

The weighting unit 35 performs weighting by multiplying the data of each branch, as supplied by the IF conversion units 32-1 to 32-2n, by the reception weight worked out by the arithmetic unit 34, and outputs the weighted data of each branch to demodulation units 36-1 to 36-2n.

The demodulation units 36-1 to 36-2n subject the data supplied by the weighting unit 35 to a demodulation process of a scheme corresponding to the modulation scheme that is used in the transmission stations 1-1, 1-2. The demodulation units 36-1 to 36-2n output the data obtained as a result of the demodulation process to storage units 37-1 to 37-2n, where the data is stored.

The modulation units 38-1 to 38-2n read the data of each branch from the storage units 37-1 to 37-2n, modulate the data in accordance with a modulation scheme identical to the modulation scheme that is used in the transmission stations 1-1, 1-2, and output the modulated data to a weighting unit 39.

The weighting unit 39 performs weighting by multiplying the data of each branch, as supplied by the modulation units 38-1 to 38-2n, by the transmission weight worked out by the arithmetic unit 46, and outputs the signal of each branch after weighting to transmission units 40-1 to 40-2n.

The transmission units 40-1 to 40-2n subject the data supplied by the weighting unit 39 to a process such as D/A conversion or the like, and output the obtained signals to RF conversion units 41-1 to 41-2n.

The RF conversion units 41-1 to 41-2n convert the signal of each branch to RF signals, and the signals are transmitted by transmission antennas 42-1 to 42-2n.

For instance, IF conversion units 44-1 to 44-2n convert, to IF signals, the RF signals supplied by the reception antennas 43-1 to 43-2n in response to reception of radio waves from the reception stations 3-1, 3-2. In this example, the reception stations 3-1, 3-2 have a function of transmitting data, in the uplink direction, according to N×N MIMO transmission. The IF signals obtained according to the conversion process are subjected, as appropriate, to a process such as A/D conversion or the like identical to that of the IF signals obtained by the IF conversion units 32-1 to 32-2n, and the obtained data is outputted to a communication channel estimation unit 45.

The communication channel estimation unit 45 detects a pilot signal on the basis of the data supplied by the IF conversion units 44-1 to 44-2n, and estimates a respective channel state between the relay station 2 and the reception station 3-1, and between the relay station 2 and the reception station 3-2. The communication channel estimation unit 45 outputs, to the arithmetic unit 46, information denoting the channel state between the relay station 2 and the reception station 3-1, and the channel state between the relay station 2 and the reception station 3-2.

On the basis of the channel states estimated by the communication channel estimation unit 45, the arithmetic unit 46 computes a transmission weight for transmitting data according to multi-user MIMO transmission. The arithmetic unit 46 outputs the transmission weight worked out by computation to the weighting unit 39.

For instance, the arithmetic unit 46 calculates, on the basis of the channel states between the relay station 2, and the reception station 3-1 and the reception station 3-2, a weight by which the data transmitted to the reception station 3-1 is to be multiplied, in such a manner that data from the transmission station 1-1 is received, according to multi-user MIMO transmission, only by the reception station 3-1, but is not received by the reception station 3-2. The arithmetic unit 46 calculates a weight by which data transmitted to the reception station 3-2 is to be multiplied, in such a manner that data from the transmission station 1-2 is received only by the reception station 3-2, but is not received by the reception station 3-1. As a result, the transmission signals from the relay station can be transmitted in such a manner that data for the respective reception stations are not influenced by each other. In consequence, it becomes possible to increase the SNR (signal-to-noise power ratio) of the desired signal.

Figure 4:
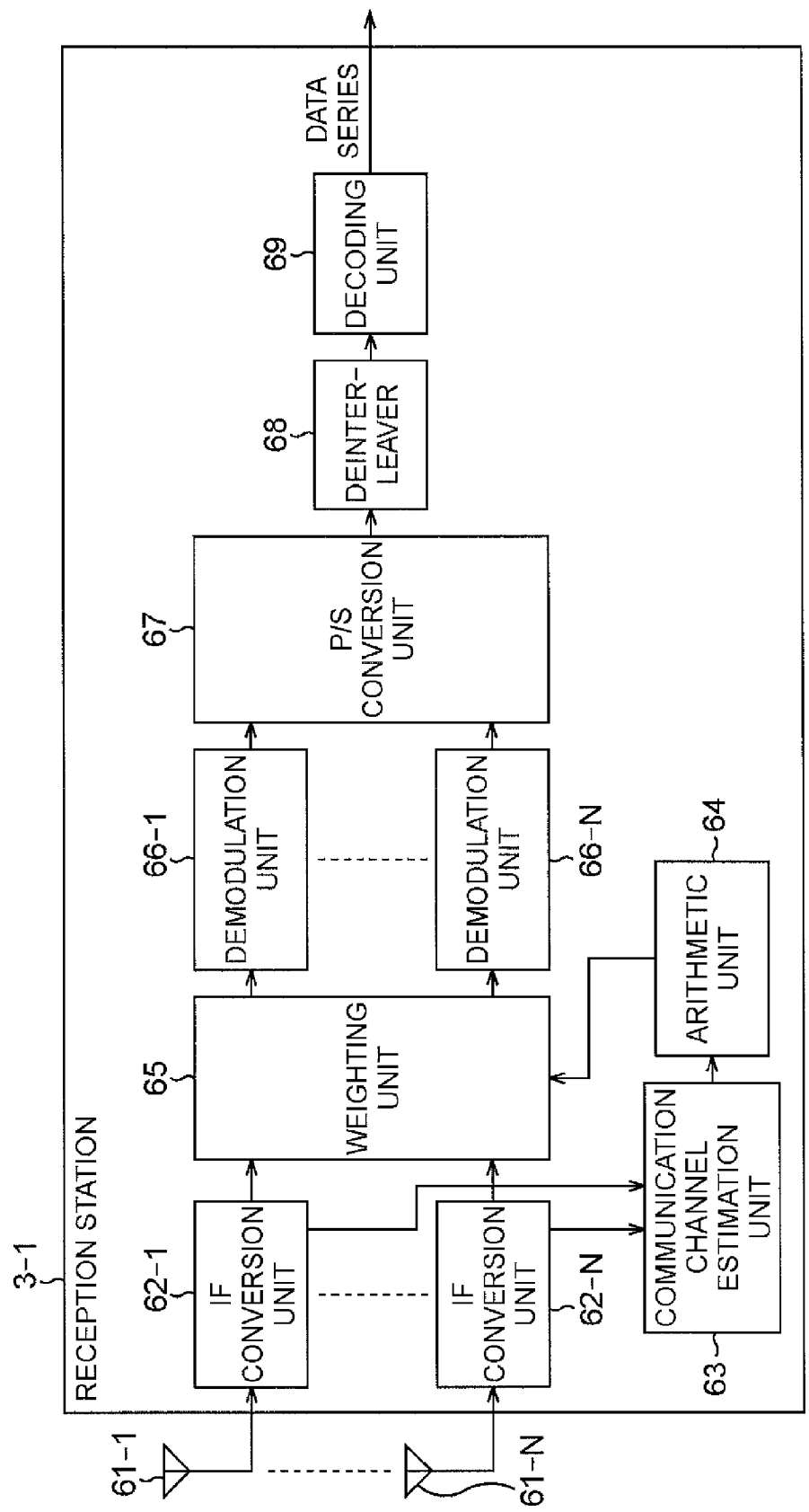
FIG. 4 is a block diagram illustrating a configuration example of a reception station.

FIG. 4 is a block diagram illustrating a configuration example of the reception station 3-1. The reception station 3-2 has the same configuration as the configuration of the reception station 3-1 illustrated in FIG. 4.

Herein, IF conversion units 62-1 to 62-N convert, to IF signals, the RF signals supplied by the reception antennas 61-1 to 61-N in response to reception of radio waves from the relay station 2. The IF signals obtained as a result of the conversion process are subjected, as appropriate, to A/D conversion, and the obtained data is outputted to a weighting unit 65. The data obtained from the IF conversion units 62-1 to 62-N is supplied also to a communication channel estimation unit 63.

The communication channel estimation unit 63 detects a pilot signal on the basis of the data supplied by the IF conversion units 62-1 to 62-N, and estimates the channel state between the relay station 2 and the reception station 3-1. The communication channel estimation unit 63 outputs, to an arithmetic unit 64, information denoting the channel state between the relay station 2 and the reception station 3-1.

On the basis of the channel state estimated by the communication channel estimation unit 63, the arithmetic unit 64 computes a reception weight for receiving data transmitted by the relay station 2 according to multi-user MIMO transmission. The arithmetic unit 64 outputs the reception weight worked out by computation to the weighting unit 65.

The weighting unit 65 performs weighting by multiplying the data of each branch, as supplied by the IF conversion units 62-1 to 62-N, by the reception weight worked out by the arithmetic unit 64, and outputs the weighted data of each branch to demodulation units 66-1 to 66-N.

The demodulation units 66-1 to 66-N subject the data supplied by the weighting unit 65 to a demodulation process of a scheme corresponding to the modulation scheme that is used in the relay station 2. The demodulation units 66-1 to 66-N output the data obtained as a result of the demodulation process to a P/S conversion unit 67.

The P/S conversion unit 67 converts the parallel data supplied by the demodulation units 66-1 to 66-N to serial data, combines the data, and outputs the combined data to a deinterleaver 68.

The deinterleaver 68 deinterleaves the data supplied by the P/S conversion unit 67, and outputs the deinterleaved data to a decoding unit 69.

The decoding unit 69 decodes the data supplied by the deinterleaver 68 in accordance with a scheme corresponding to the encoding scheme that is used in the transmission station 1-1, and outputs a data series comprising the obtained data.

<Operation of the Relay Station 2>

Figure 5:
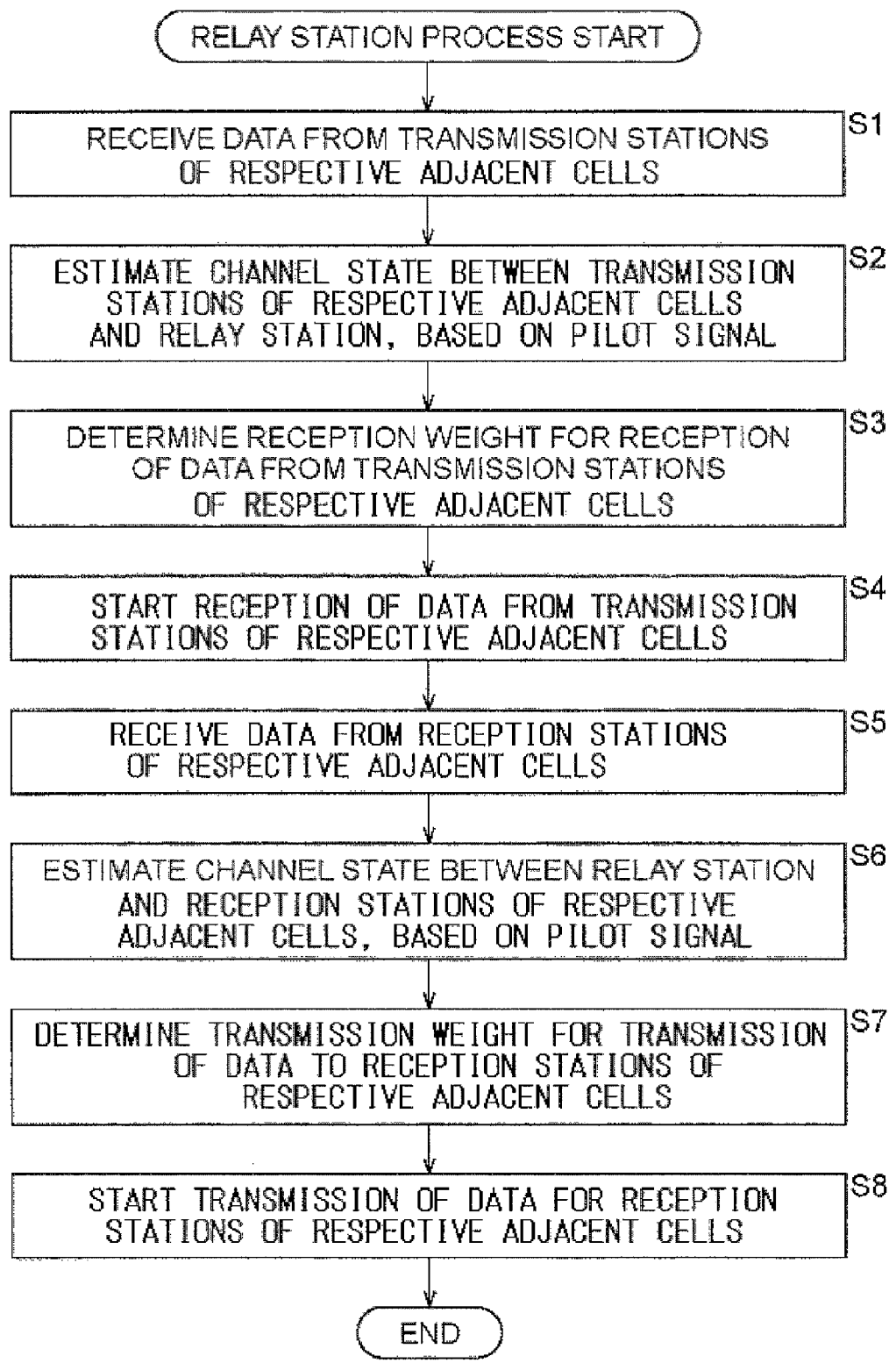
FIG. 5 is a flowchart for explaining a process in a relay station.

The process in the relay station 2 will be explained next with reference to the flowchart of FIG. 5.

In step S1, the IF conversion units 32-1 to 32-2n convert to IF signals the RF signals supplied by the reception antennas 31-1 to 31-2n, and processes such as A/D conversion, FFT and the like are carried out, to receive as a result data from the transmission stations 1-1, 1-2 that are transmission stations of respective adjacent cells.

In step S2, the communication channel estimation unit 33 detects a pilot signal from the data received by the IF conversion units 32-1 to 32-2n, and, on the basis of the detected pilot signal, estimates respective channel states between the transmission station 1-1 and the relay station 2 and between the transmission station 1-2 and the relay station 2.

In step S3, the arithmetic unit 34 performs computations on the basis of the channel states between the transmission station 1-1 and the relay station 2, and between the transmission station 1-2 and the relay station 2, separates data from the transmission station 1-1 and data from the transmission station 1-2, and determines a reception weight for reception.

In step S4, there is initiated reception of data transmitted by the transmission station 1-1 and of data transmitted by the transmission station 1-2. That is, the RF signals supplied by the reception antennas 31-1 to 31-2n are converted to IF signals in the IF conversion units 32-1 to 32-2n, and the IF signals are subjected to various processes such as A/D conversion, FFT and the like. The data of each branch obtained as a result of the various processes is weighted, in the weighting unit 35, according to the reception weight worked out by the arithmetic unit 34. The weighted data of each branch is subjected to a demodulation process in the demodulation units 36-1 to 36-2n ; as a result, the data transmitted by the transmission station 1-1 and the data transmitted by the transmission station 1-2 is received and is stored in the storage units 37-1 to 37-2n.

In step S5, the IF conversion units 44-1 to 44-2n convert to IF signals the RF signals supplied by the reception antennas 43-1 to 43-2n, and the signals are subjected to processes such as A/D conversion, FFT and the like; as a result there are received signals from the reception stations 3-1, 3-2 which are reception stations of respective adjacent cells. The IF conversion units 44-1 to 44-2n output the received signals to the communication channel estimation unit 45.

In step S6, the communication channel estimation unit 45 detects a pilot signal from the data received by the IF conversion units 44-1 to 44-2n, and on the basis of the detected pilot signal, estimates a respective channel state between the relay station 2 and the reception station 3-1, and between the relay station 2 and the reception station 3-2.

In step S7, the arithmetic unit 46 performs computations on the basis of the channel states between the relay station 2 and the reception station 3-1 and between the relay station 2 and the reception station 3-2, and determines a transmission weight for transmission of data from the transmission station 1-1 and data from the transmission station 1-2.

In step S8 there is initiated transmission of data to the reception station 3-1 and the reception station 3-2. Specifically, the data of each branch, stored in the storage units 37-1 to 37-2n, is modulated in the modulation units 38-1 to 38-2n, and the modulated data is weighted in the weighting unit 39 using the transmission weight worked out by the arithmetic unit 46. The weighted data of each branch is subjected, as appropriate, to processes such as IFFT, D/A conversion and the like, in the transmission units 40-1 to 40-2n. The signals obtained as a result of the various processes that are performed are converted to RF signals in the RF conversion units 41-1 to 41-2n, and are transmitted by the transmission antennas 42-1 to 42-2n. The process ends once transmission of data is over.

The above process allows signal power to be amplified in the relay station 2, and allows increasing channel capacity in the reception stations 3-1, 3-2. The data from the transmission stations 1-1, 1-2 is separated once in the relay station 2, and is transmitted thereafter in accordance with multi-user MIMO transmission; as a result, it becomes possible to suppress interference from adjacent cells to a greater degree than in a case where signal power is simply amplified and retransmitted.

Moreover, the above features can be realized without significantly modifying the configurations on the transmission station side and the reception station side. That is, the only process, from among the processes that are performed in the transmission stations 1-1, 1-2 upon MIMO transmission, that is different from known processes performed in existing transmission stations, is the additional process of establishing data synchronization, while other processes, such as those that share a channel state, need not be carried out in the transmission station 1-1 and the transmission station 1-2. This allows keeping costs down upon implementation of the communication system of FIG. 1.

<Simulation Results>

An explanation follows next on an evaluation of communication quality by computer simulation that envisages a model identical to that of the communication system of FIG. 1.

Figure 6:
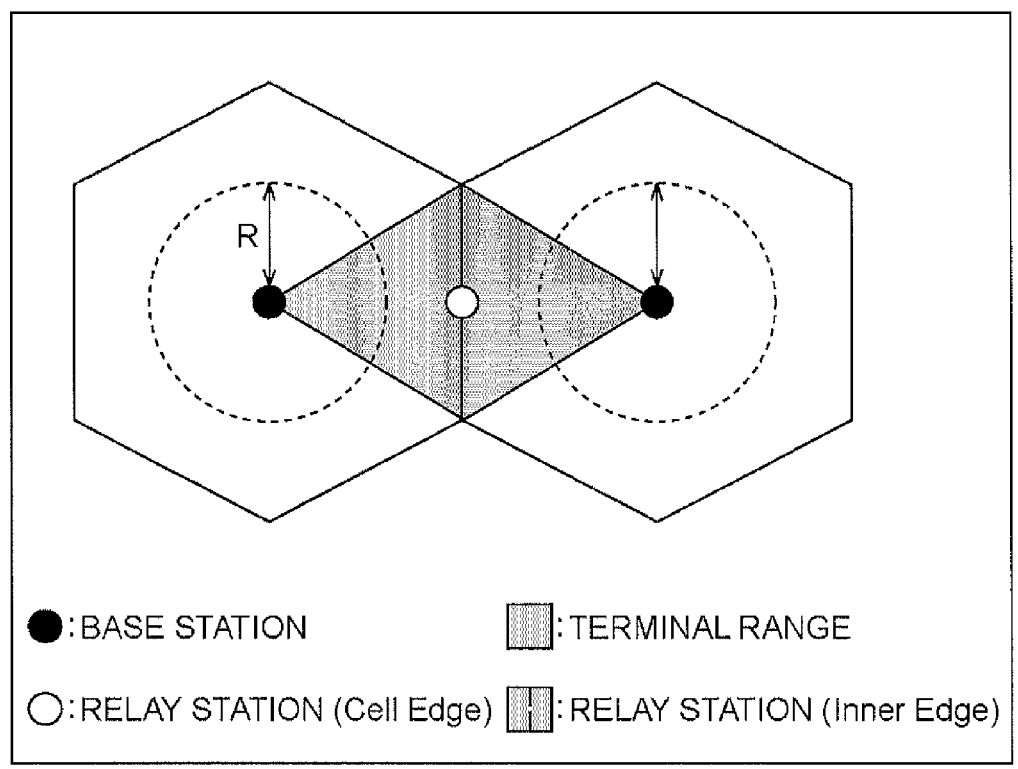
FIG. 6 is a diagram illustrating a simulation model.

FIG. 6 is a diagram illustrating a simulation model. The two hexagons in FIG. 6 are adjacent cells. In the explanation below, the cell on the left side will be referred to as cell 1, and the cell on the right side will be referred to as cell 2. The black circles at the centers of the respective hexagons represent base stations (transmission stations) and the white circle between the two hexagons represents a relay station. Terminals (reception stations) are disposed randomly within the colored area.

The dashed-line circles of radius R represent the distance between the base station and a conventional relay station (a relay station that simply amplifies and retransmits a signal), the conventional relay station being disposed at a predetermined position on the dashed-line circle within the colored area. Hereafter, the relay station disposed at the cell edge will denote a relay station (relay station of the present invention) that is disposed at the position of the white circle, while a relay station disposed within a cell will denote a conventional relay station that is disposed at a predetermined position on the dashed-line circle, within the colored area.

The left hexagon of FIG. 6 corresponds for instance to the cell C1 in FIG. 1, and the right hexagon corresponds to the cell C2. The black circle at the center of the left hexagon corresponds to the transmission station 1-1, the black circle at the center of the right hexagon corresponds to the transmission station 1-2, and the white circle between the left hexagon and the right hexagon corresponds to the relay station 2. The position of the reception station 3-1 corresponds to a position, within the colored area, inside the left hexagon of FIG. 6, and the position of the reception station 3-2 corresponds to a position, within the colored area, inside the right hexagon of FIG. 6.

FIG. 7 sets out the parameters used in the simulation. As illustrated in FIG. 7, the frequency band is 2.0 GHz, the frequency bandwidth is 5 MHz, the cell radius is 1000 m, and the base station-relay station radius (R in FIG. 6), at a time where the relay station is disposed within the cell, is 500 m. Further, the distance attenuation (r[km]) is 128.1+37.6 log 10(r) dB, the shadowing standard deviation is 8 dB, and the indoor transmission attenuation is 20 dB. The number of antennas in each base station is two, the number of antennas in the relay station that is disposed in the cell is two, the number of antennas in the relay station that is disposed at the cell edge is four, and the number of antennas in each terminal is two. The transmission power of the base station is 43 dBm, the transmission power of the relay station disposed in the cell is 37 dBm, the transmission power of the relay station disposed at the cell edge is 40 dBm, and the noise power density is −169 dBm/Hz.

Four transmission methods, namely a MIMO direct transmission method, a MIMO ordinary relay transmission method, a MIMO TDMA relay transmission method and a multi-user MIMO relay transmission method (method of the present invention) are evaluated according to such parameter settings.

The MIMO direct transmission method is a method in which data is transmitted directly from a base station to a terminal in accordance with N×N MIMO transmission. The data is not relayed by a relay station. The transmission scheme is E-SDM.

The MIMO ordinary relay transmission method is a method wherein, in each cell, data is transmitted by a transmission station to a terminal by way of a relay station that is disposed within the cell. Herein, N×N MIMO transmission is performed between each node, i.e. between the base station and the relay station, and the relay station and the terminal, in each cell. The transmission scheme between the base station and the terminal, and between the relay station and the terminal, is E-SDM, and weight computation at the base station and the relay station is performed according to ZF.

The MIMO TDMA relay transmission method is a method in which a relay station having 2n antennas is disposed at the center between a base station of a cell 1 and a base station of a cell 2, and data is transmitted by way of this relay station. Transmission is performed by dividing the transmission time slot into three, in order to enable relaying without interference. Reception of data by the relay station is carried out in such a manner that data from the base stations of both cells is received simultaneously in accordance with 2n ×2n MIMO transmission. Transmission of data by the relay station is performed, in accordance with 2n ×N MIMO transmission, by dividing the transmission time slot into transmission from the relay station to the terminal of cell 1 and transmission from the relay station to the terminal of cell 2. The time slots will be explained further on with reference to FIG. 8. The transmission scheme between the base station and the terminal, and between the relay station and the terminal, is E-SDM, and weight computation is performed according to ZF.

The multi-user MIMO relay transmission method is a method in which a relay station having 2n antennas is disposed at the center between a base station of cell 1 and a base station of cell 2, and data is transmitted by way of this relay station. Reception of data by the relay station is carried out in such a manner that data from the base stations of both cells is received simultaneously in accordance with 2n ×2n MIMO transmission. Transmission of data by the relay station is performed by space division multiplexing, in accordance with 2n ×(N, 2) multi-user MIMO transmission. The transmission scheme between the base station and the terminal, and between the relay station and the terminal, is E-SDM, and weight computation is performed according to ZF.

Figure 8:
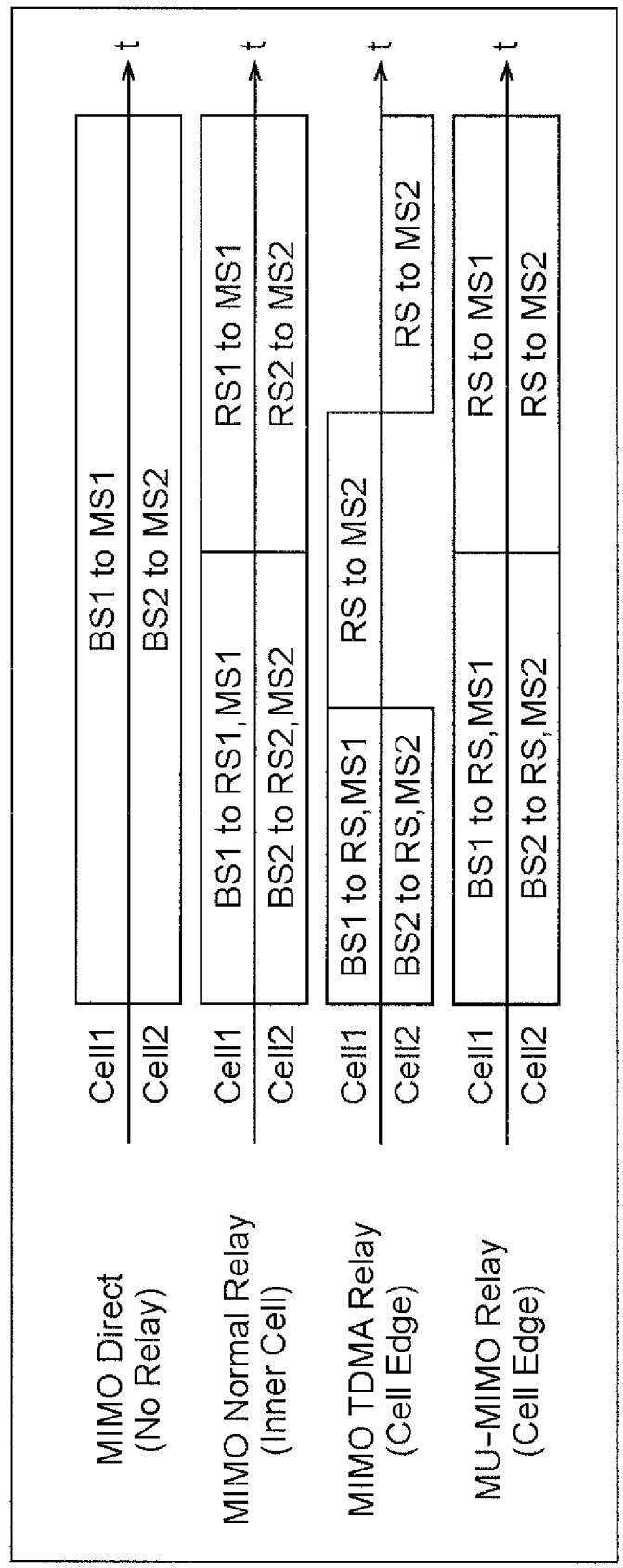
FIG. 8 is a diagram illustrating transmission time slots in respective transmission methods.

FIG. 8 is a diagram illustrating the manner in which the transmission time slots are used in instances where data is transmitted according to the respective method. The abscissa axes in FIG. 8 represent time. The portion above each abscissa axis represents the transmission content in cell 1, and the portion below the abscissa axis denotes the transmission content in cell 2. Further, BS (Base Station) denotes a base station, RS (Relay Station) denotes a relay station and MS (Mobile Station) denotes a terminal. The numerals suffixed to BS, RS, MS represent the cell in which the foregoing are present.

The usage of the transmission time slots in a case where data is transmitted in accordance with the MIMO direct transmission method is illustrated in the first tier. In this case there is used the entirety of a predetermined time per slot, such that data is transmitted by BS1 to MS1 in cell 1, and data is transmitted by BS2 to MS2 in cell 2.

The usage of the transmission time slots in a case where data is transmitted in accordance with the MIMO ordinary relay transmission method is illustrated in the second tier. In this case, the entirety of the predetermined time per slot is divided into two, such that in the first slot, data is transmitted by BS1 to RS1 and MS1 in cell 1, and data is transmitted by BS2 to RS2 and MS2 in cell 2. In the second slot, data is transmitted by RS1 to MS1 in cell 1, and data is transmitted by RS2 to MS2 in cell 2.

The usage of the transmission time slots in a case where data is transmitted in accordance with the MIMO TDMA relay transmission method is illustrated in the third tier. In this case, the entirety of the predetermined time per slot is divided into three, such that in the first slot, data is transmitted by BS1 to RS and MS1 in cell 1, and data is transmitted by BS2 to RS and MS2 in cell 2. In the second slot, data is transmitted by RS to MS1 in cell 1, and in the third slot, data is transmitted by RS to MS2 in cell 2. Herein, transmission between a relay station and a terminal in one cell is prevented from interfering with transmission between a relay station and a terminal in the other cell. However, transmission takes some time.

The usage of the transmission time slots in a case where data is transmitted in accordance with the multi-user MIMO relay transmission method is illustrated in the fourth tier. In this case, the entirety of the predetermined time per slot is divided into two, such that in the first slot, data is transmitted by BS1 to RS and MS1 in cell 1, and data is transmitted by BS2 to RS and MS2 in cell 2. In the second slot, data is transmitted by RS to MS1 in cell 1, and data is transmitted by RS to MS2 in cell 2, in accordance with multi-user MIMO transmission.

Figure 9:
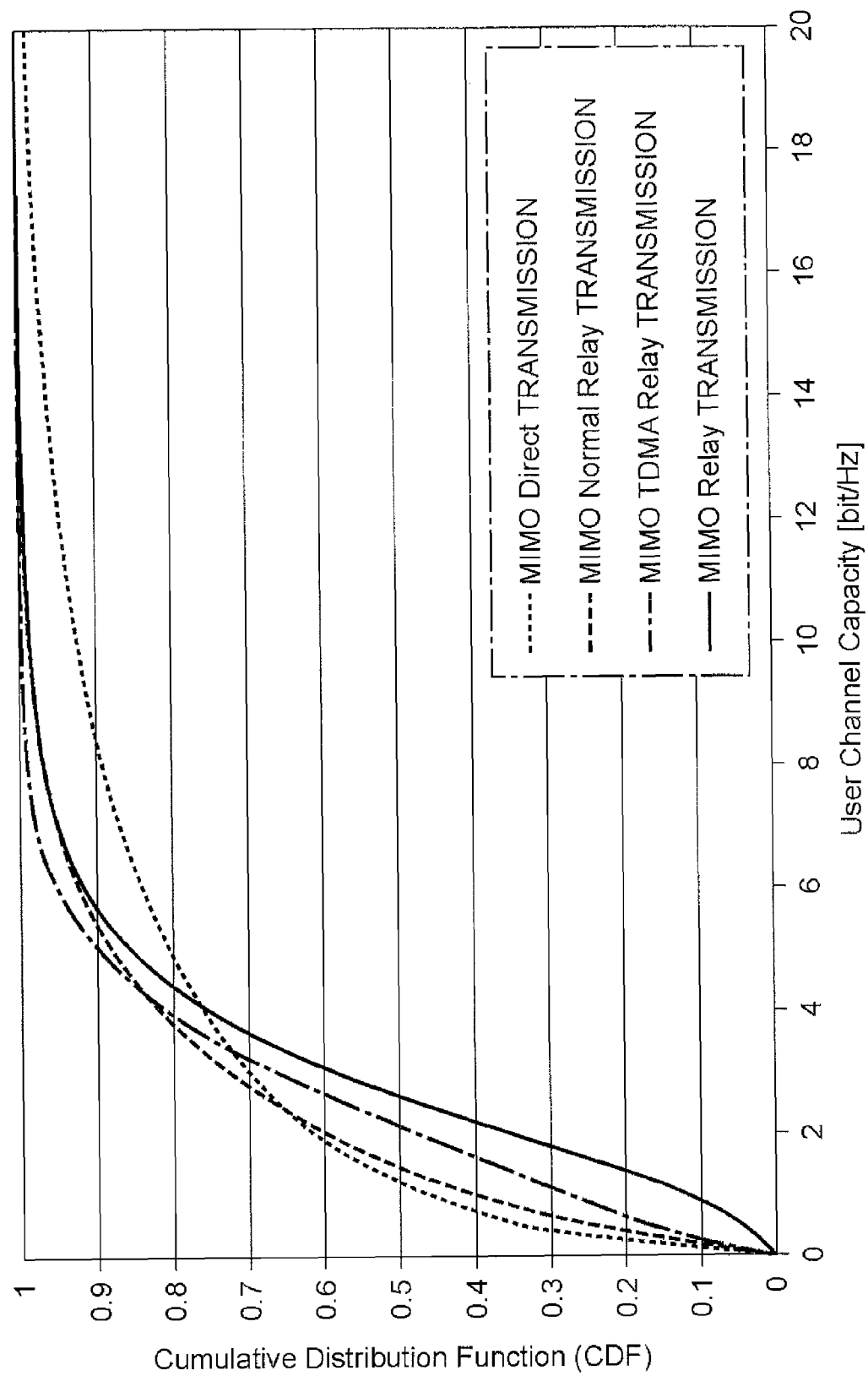
FIG. 9 is a diagram illustrating simulation results.

FIG. 9 is a diagram illustrating CDF (Cumulative Distribution Function) characteristics for the simulated data transmission in accordance with each method. The ordinate axis in FIG. 9 represents a CDF, and the abscissa axis represents channel capacity. As indicated by the solid-line curve, the multi-user MIMO relay transmission method allows achieving the best transmission characteristic, with a high rate of change of channel capacity at a region of low transmission capacity, in the vicinity of 0 to 4 bit/Hz.

Figure 10:
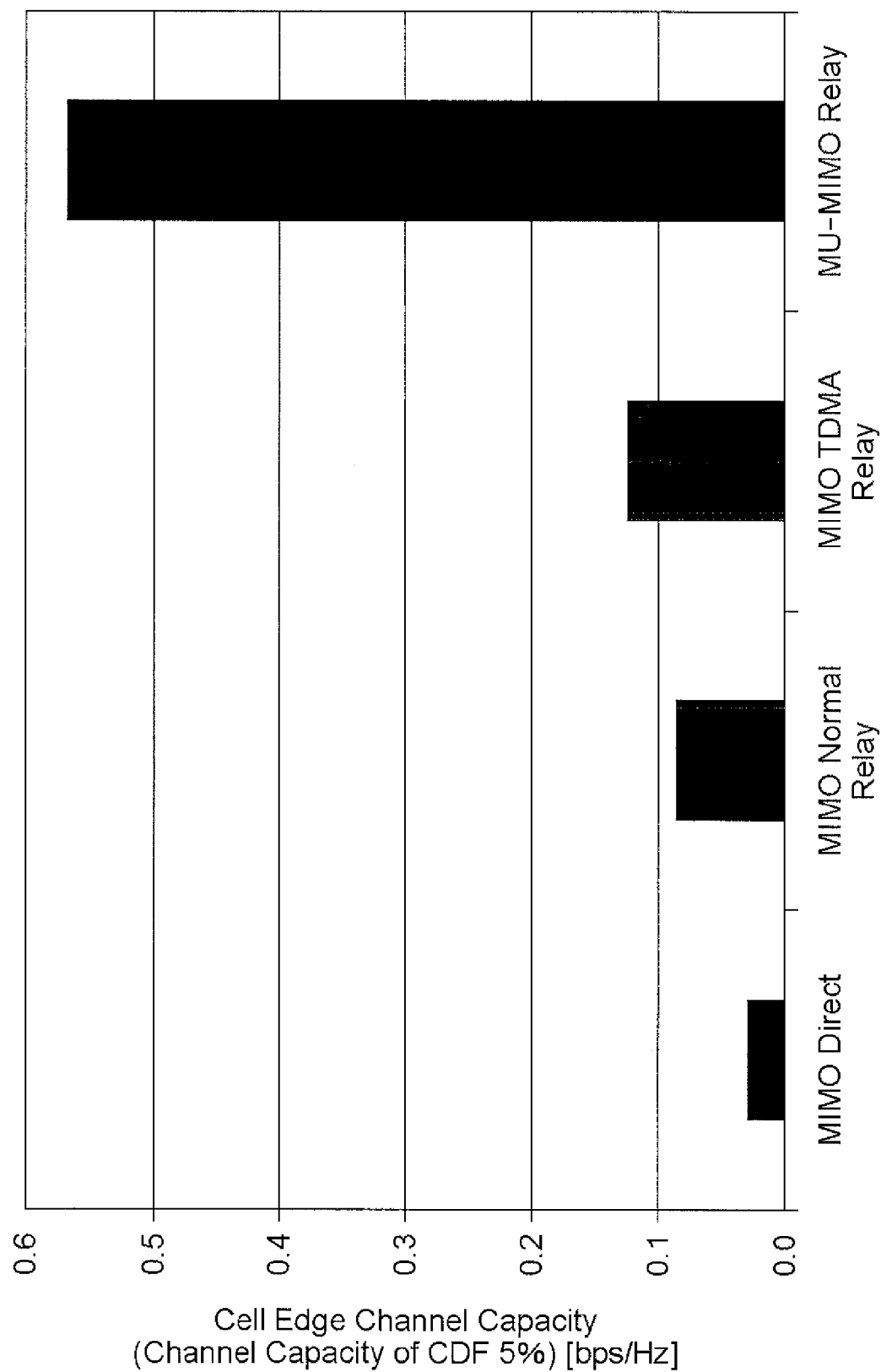
FIG. 10 is another diagram illustrating simulation results.

FIG. 10 is a diagram illustrating channel capacity for a simulation of data transmission for CDF 5%. Channel capacity for CDF 5% is defined as the channel capacity at a cell edge in a standard such as IMT-advanced. As illustrated in FIG. 10, it becomes possible to achieve the best transmission characteristic if the multi-user MIMO relay transmission method is resorted to, also for a channel capacity for CDF 5%. For instance, the channel capacity in the multi-user MIMO relay transmission method for CDF 5% is about five-fold the channel capacity of the MIMO TDMA relay transmission method.

<Variation>

Downlink data transmission in the direction base station to terminal has been explained above, but the above-described multi-user MIMO relay transmission method can also be used for uplink data transmission in the direction terminal to base station.

In this case, the transmission stations 1-1, 1-2 in FIG. 1 include the configuration of FIG. 4 in addition to the configuration of FIG. 2. The reception stations 3-1, 3-2 include the configuration of FIG. 2 in addition to the configuration of FIG. 4. In uplink data transmission, the transmission stations 1-1, 1-2 function as reception stations, and the reception stations 3-1, 3-2 function as transmission stations. The transmission antennas and the reception antennas can be shared antennas. Synchronization of data transmission timings is established between the reception station 3-1 and the reception station 3-2.

Figure 11:
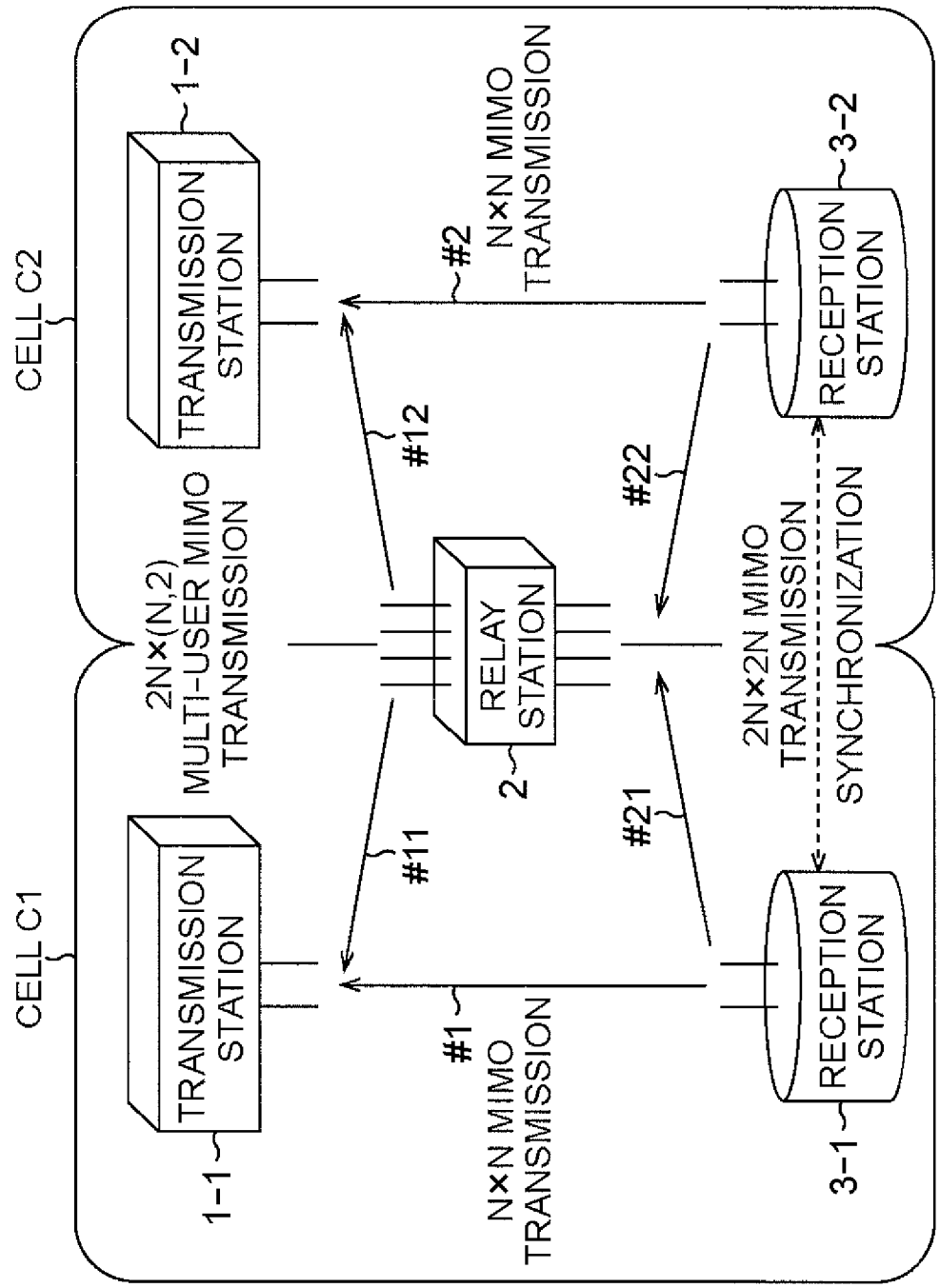
FIG. 11 is a diagram for explaining uplink data transmission.

FIG. 11 is a diagram illustrating an example of a communication system in an instance of uplink data transmission in accordance with a multi-user MIMO relay transmission method.

Herein, N×N MIMO transmission is performed, as denoted by arrow #1, between the reception station 3-1, having N transmission antennas, and the transmission station 1-1, having N reception antennas, that are present in the cell C1. Likewise, N×N MIMO transmission is performed, as denoted by arrow #2, between the reception station 3-2, having N transmission antennas, and the transmission station 1-2, having N reception antennas, that are present in the cell C2.

The relay station 2 receives radio waves that are transmitted by both the reception station 3-1 and the reception station 3-2, using 2n reception antennas, and acquires data transmitted by the reception station 3-1 and data transmitted by the reception station 3-2. Herein, 2n ×2n MIMO transmission as denoted by arrows #21, #22 is carried out between the reception stations and the relay station, considering the reception station 3-1 and the reception station 3-2, which transmit data by keeping synchronization, to be one station.

As denoted by arrows #11, #12, the relay station 2 transmits, to the transmission station 1-1, data transmitted by the reception station 3-1, in accordance with 2n ×(N, 2) multi-user MIMO transmission, and transmits, to the transmission station 1-2, data transmitted by the reception station 3-2.

The transmission stations 1-1, 1-2 receive data transmitted by the relay station 2 in accordance with multi-user MIMO transmission. The data transmitted by the reception station 3-1 is relayed by the relay station 2 and is received by the transmission station 1-1, and the data transmitted by the reception station 3-2 is relayed by the relay station 2 and is received by the transmission station 1-2.

Thus, a multi-user MIMO relay transmission method can be used for both uplink and downlink data transmission. Uplink data transmission as well can be performed efficiently by utilizing a multi-user MIMO relay transmission method.

An instance has been explained above wherein the number of adjacent cells is two, but a configuration is also possible wherein signals from transmission stations of three or more cells are received by the relay station, and the signals are transmitted by the relay station, in accordance with multi-user MIMO, to reception stations that are present in respective cells.

The embodiments of the present invention are not limited to those explained above, and may accommodate various modifications without departing from the scope of the invention.

EXPLANATION OF REFERENCE NUMERALS

1-1, 1-2 transmission station, 2 relay station, 3-1, 3-2 reception station, 31-1 to 31-2n reception antenna, 32-1 to 32-2n IF conversion unit, 33 communication channel estimation unit, 34 arithmetic unit, 35 weighting unit, 36-1 to 36-2n demodulation unit, 37-1 to 37-2n storage unit, 38-1 to 38-2n modulation unit, 39 weighting unit, 40-1 to 40-2n transmission unit, 41-1 to 41-2n RF conversion unit, 42-1 to 42-2n transmission antenna, 43-1 to 43-2n reception antenna, 44-1 to 44-2n IF conversion unit, 45 communication channel estimation unit, 46 arithmetic unit

The invention claimed is:

1. A communication device that relays data between a plurality of transmitting devices and a receiving device, comprising:

a first estimation unit that estimates a state of respective communication channels between the communication device and a plurality of transmitting devices that are present in respective distinct cells and that transmit data in accordance with MIMO transmission;

a reception unit that is common to the plurality of transmitting devices, and that receives data, respectively transmitted by the plurality of transmitting devices without sharing transmission data or channel state information among the respective transmitting devices, in accordance with a transmission timing in which synchronization between the transmitting devices is established, via an antenna that receives radio waves transmitted by the plurality of transmitting devices, and that separates the received data into data pieces respectively transmitted from the plurality of transmitting devices by using a reception weight determined on the basis of the state of the communication channels as estimated by the first estimation unit; and a transmission unit that determines weights, wherein transmission weighting is performed according to E-SDM (Eigenbeam-Space Division Multiplexing), and that transmits, in accordance with multi-user MIMO transmission, the separated respective data to a plurality of receiving devices present in the respective cells in which data is transmitted by the plurality of transmitting devices, wherein the weighting is performed by multiplying the data of each branch.

2. The communication device according to claim 1, wherein the cells are adjacent cells, and the communication device is present on or in the vicinity of a boundary of the adjacent cells.

3. The communication device according to claim 1, further comprising a second estimation unit that estimates the state of respective communication channels between the communication device and the plurality of receiving devices, wherein
the transmission unit transmits data received by the reception unit in use of a transmission weight determined on the basis of the state of the communication channels as estimated by the second estimation unit.

4. A communication method by a communication device that relays data between a plurality of transmitting devices and a receiving device, comprising:
estimating a state of respective communication channels between the communication device and a plurality of transmitting devices that are present in respective distinct cells and that transmit data in accordance with MIMO transmission;
receiving data respectively transmitted by the plurality of transmitting devices without sharing transmission data or channel state information among the respective transmitting devices, in accordance with a transmission timing in which synchronization between the transmitting devices is established, via an antenna that receives radio waves transmitted by the plurality of transmitting devices; and
separating, by a reception unit which is common to the plurality of transmitting devices, the received data into data pieces respectively transmitted from the plurality of transmitting devices by using a reception weight determined on the basis of the state of the estimated communication channels;
weighting the received data by using the determined reception weight, wherein the weighting is performed by multiplying the data of each branch, wherein the weighting is performed according to E-SDM (Eigenbeam-Space Division Multiplexing); and
transmitting the separated respective data, in accordance with multi-user MIMO transmission, to a plurality of receiving devices present in the respective cells in which data is transmitted by the plurality of transmitting devices.

5. A communication system comprising a plurality of transmitting devices, a plurality of receiving devices and a communication device that relays data between a plurality of transmitting devices and a receiving device, wherein
the plurality of transmitting devices are present in respective distinct cells, with each of the transmitting device comprising:
a synchronization unit that establishes synchronization of a transmission timing of data with other transmitting devices; and
a transmission unit that determines weights, wherein transmission weighting is performed according to E-SDM (Eigenbeam-Space Division Multiplexing), and that transmits, data without sharing transmission data or channel state information among the respective transmitting devices, by MIMO transmission, according to a transmission timing in which synchronization is established by the synchronization unit, and
the communication device comprises:
a first estimation unit that estimates the state of respective communication channels between the communication device and the plurality of transmitting devices;
a reception unit that is common to the plurality of transmitting devices, and that receives data respectively transmitted by the plurality of transmitting devices, via an antenna that receives radio waves transmitted by the plurality of transmitting devices, and that separates the received data into data pieces respectively transmitted from the plurality of transmitting devices by a reception weight is determined on the basis of the state of communication channels as estimated by the first estimation unit;
wherein the weighting is performed by multiplying the data of each branch, and a transmission unit that transmits, in accordance with multi-user MIMO transmission, the separated respective data to the plurality of receiving devices, and
wherein the plurality of receiving devices are respectively present in the cells in which the plurality of transmitting devices manage transmission of data, with each of the receiving devices comprising:
a second estimation unit that estimates the state of a communication channel between the receiving device and the communication device; and
a reception unit that receives data transmitted by the communication device in use of a reception weight determined on the basis of the state of the communication channel as estimated by the second estimation unit.

6. A communication method by a communication device that relays data between a plurality of transmitting devices and a receiving device, comprising:
receiving data from a plurality of transmission stations of respective adjacent cells;
detecting a pilot signal received from the plurality of transmission stations;
estimating respective channel states between each of the plurality of transmission stations of the respective adjacent cells and a relay station based on the pilot signal received from the plurality of transmission stations;
determining a reception weight for reception of data from the transmission stations of respective adjacent cells based on the estimated channel states between each of the plurality of transmission stations of the respective adjacent cells and the relay station;

receiving data from reception stations of the respective adjacent cells; and weighting the received data from reception stations by using the determined reception weight, wherein the weighting is performed by multiplying the data of each branch; and estimating a channel state between each of the reception stations of the respective adjacent cells and a relay station based on a pilot signal received from the reception stations;

determining a transmission weight for transmission of data to the reception stations of the respective adjacent cells based on the estimated channel states between each of the reception stations and the relay station, wherein transmission weighting is performed according to E-SDM (Eigenbeam-Space Division Multiplexing); and initiating transmission of respective data using the transmission weight, in accordance with multi-user MIMO transmission, to the reception stations of the respective adjacent cells.

* * * * *